United States Patent
Manning et al.

(10) Patent No.: US 6,604,081 B1
(45) Date of Patent: Aug. 5, 2003

(54) METHOD FOR ANALYZING PROFITABILITY OF FREIGHT LOAD HAULING OPERATIONS

(75) Inventors: Kenneth M. Manning, Potomac, MD (US); William R. Shults, Gaithersburg, MD (US)

(73) Assignee: Transportation Costing Group, Inc., Bethesda, MD (US)

(*) Notice: Subject to any disclaimer, the term of this patent is extended or adjusted under 35 U.S.C. 154(b) by 0 days.

(21) Appl. No.: 09/477,363

(22) Filed: Jan. 4, 2000

(51) Int. Cl.$^7$ .................................................. G06G 7/78
(52) U.S. Cl. ............................ 705/7; 701/209; 705/400
(58) Field of Search ................................ 701/209, 117, 701/201, 210; 705/400, 7

(56) References Cited

U.S. PATENT DOCUMENTS

| | | | |
|---|---|---|---|
| 5,140,526 A | 8/1992 | McDermith et al. | |
| 5,249,120 A | 9/1993 | Foley | |
| 5,541,858 A | 7/1996 | Warner | |
| 5,546,564 A | 8/1996 | Horie | |
| 5,689,423 A | 11/1997 | Sawada | |
| 5,712,788 A | * 1/1998 | Liaw et al. .................. 701/209 |
| 5,721,678 A | 2/1998 | Widl | |
| 5,729,458 A | 3/1998 | Poppen | |
| 5,742,914 A | 4/1998 | Hagenbuch | |
| 5,878,368 A | * 3/1999 | DeGraff ...................... 701/209 |
| 5,880,958 A | * 3/1999 | Helms et al. ............... 701/117 |
| 5,893,081 A | 4/1999 | Poppen | |
| 6,026,384 A | * 2/2000 | Poppen ....................... 705/400 |

OTHER PUBLICATIONS

Cost & Effect Robert S. Kaplan chapter 6.*
Hand Book of Financial Mathematics and Formulas and table Robert P. Vichas chapter 12.*
Airline Business, Aug., 1994, "Hard to Swallow".*

* cited by examiner

Primary Examiner—Richard Chilcot
(74) Attorney, Agent, or Firm—Rothwell, Figg, Ernst & Manbeck, P.C.

(57) ABSTRACT

The method allows for analyzing the profitability of each of two or more freight loads hauled by a freight-hauling vehicle while the vehicle travels through a round trip from a home location to a terminating location. The total cost associated with all of the freight loads carried during the round trip are apportioned among each of the freight loads based on the revenue contribution of the load, the total revenue from the round trip, the actual cost associated with the load, and the total cost of the round trip. A computer-readable medium is encoded with a plurality of processor-executable instruction sequences for analyzing the profitability of each of two or more freight loads hauled by a freight-hauling vehicle while the vehicle travels through a round trip from a home location to a terminating location.

15 Claims, 3 Drawing Sheets

METHOD FOR ANALYZING PROFITABILITY OF FREIGHT LOAD HAULING OPERATIONS

FIELD OF THE INVENTION

The present invention is related to a method for analyzing the profitability of freight loads carried during a round trip by for-hire motor common carriers by apportioning the total cost of the round trip to each of the loads.

BACKGROUND OF THE INVENTION

The inventors of the present invention have been producing cost models for the trucking industry for many years, and have found that, from their experience, profitability analysis in the irregular route, or truckload, segment of the industry misses what they consider a critical component of cost allocation. This critical component is the calculation of the impact of "headhaul" vs. "backhaul" freight, which will be further explained herein. Currently, the impact of "headhaul" vs. "backhaul" freight is evaluated using general estimates or rules of thumb, rather than with a mechanism for actual cost allocation.

An irregular route driver generally goes on the road from a home base, or domicile, usually at or near the driver's residence, often for many days, moving two or more loads from one location to another before returning home again. In addition to the loaded miles, i.e. distances traveled while carrying a load, the trip usually involves one or more segments of empty miles while the driver moves the vehicle unloaded from a drop-off destination to a subsequent pick-up destination. In the context of the present disclosure, this sequence of moving two or more loads from the time the driver leaves the home base until the driver returns to the home base, or some other termination point, is called a round trip. Motor carriers effectively "purchase" these round trips from their employee-drivers, which is disguised by the fact that they usually pay drivers on a per-mile basis.

Each load carried during the round trip will generate income revenue from the price charged for hauling the load. In addition, the motor carrier will incur costs directly associated with the operation of the vehicle over the round trip. These costs, known as linehaul costs, include driver wages and vehicle operation costs, such as fuel, depreciation, insurance, heat/refrigeration, etc. These costs are typically expressed and evaluated in terms of a particular cost per mile of vehicle operation. Most of these costs will be incurred whether the vehicle is empty or loaded. Other costs that will be incurred are not directly related to the operation of the vehicle and are known as non-linehaul costs. Such costs may include load handling charges, tank cleaning costs, the cost of lumpers, and general administrative costs associated with securing, scheduling, and processing each freight load.

For accounting purposes, motor carriers tend to treat each load of a round trip as a separate service transaction in which the revenues generated for that particular load are compared to the costs associated with that particular load to derive a profit (or loss) figure associated with that particular load. Typically, empty miles driven during a round trip are accounted for by adding all the costs associated with operating the vehicle over the empty miles to the costs of the load immediately proceeding or immediately following the empty miles driven.

In a typical round trip scenario, profits generated by the primary load heading out from the home location, known as the headhaul, would be higher than the profits generated by the load or loads carried between intermediate locations on the way to the round trip termination point, known as the backhaul. In fact, backhaul loads are typically seen as a means for defraying the costs of getting the vehicle back after the headhaul load. In other scenarios, this sequence could be reversed, with the driver taking a backhaul load first to get to an area with headhaul loads coming back. If the backhaul loads return an unacceptably low profit, or even a loss, prices for the headhaul loads may be increased correspondingly to compensate for the low profits or losses incurred in the backhaul, if the market in that traffic lane permits. Since backhaul loads are typically seen as a means for defraying the costs of getting the vehicle back to the home location, or, alternatively, to a distant headhaul pickup location, carriers typically discount the lack of profit or the losses to the fact that these are backhaul loads, with little or no consideration given to whether the profits generated by the headhaul loads would be sufficient to compensate the low profits and/or losses associated with the backhaul loads.

The current methods for analyzing costs and profits for round trips consisting of two or more loads carried by a motor vehicle are inadequate because the costs and revenues associated with each load are treated independently. Therefore, the motor carrier is not accounting for the fact that it buys round trips, not individual loads, from its drivers; nor does it account for the profit ramifications of that fact on any one load.

SUMMARY OF THE INVENTION

In accordance with the present invention, a method is provided for analyzing the profitability of each of two or more freight loads moved within a round trip of a freight vehicle during which the two or more freight loads are moved, one at a time, from one location along the round trip route to another location along the round trip route by the freight vehicle. In the preferred embodiment, a revenue contribution of each of the two or more freight loads of the round trip is identified, and the revenue contributions of the two or more freight loads are summed to obtain a total round trip revenue. A cost associated with each of the two or more freight loads of the round trip is identified, and the costs associated with the two or more freight loads are summed to obtain a total round trip cost. The load cost identification includes an allocation of identified empty mile costs. The total round trip cost is then apportioned among each of the two or more freight loads based on the revenue contribution of the freight load, the total round trip revenue, and the total round trip cost.

According to another aspect of the invention, a computer-readable medium is encoded with a plurality of processor-executable instruction sequences for analyzing the profitability of each of two or more freight loads moved within a round trip of a freight vehicle during which the two or more freight loads are moved, one at a time, from one location along the round trip route to another location along the round trip route by the freight vehicle. The processor-executable instructions sequences comprise identifying a revenue contribution of each of the two or more freight loads of the round trip and summing the revenue contributions of the two or more freight loads to obtain a total round trip revenue, identifying a cost associated with each of the two or more freight loads of the round trip and summing the costs associated with the two or more freight loads to obtain a total round trip cost, and apportioning the total round trip cost among each of the two or more freight loads based on the revenue contribution of the freight load, the total round trip revenue, and the total round trip cost.

Other features and characteristics of the present invention, as well as the methods of operation of the invention and the function and interrelation of the steps and elements thereof, will become more apparent upon consideration of the following description and the appended claims with reference to the accompanying drawings, all of which form a part of this disclosure.

DETAILED DESCRIPTION

Figure 1:
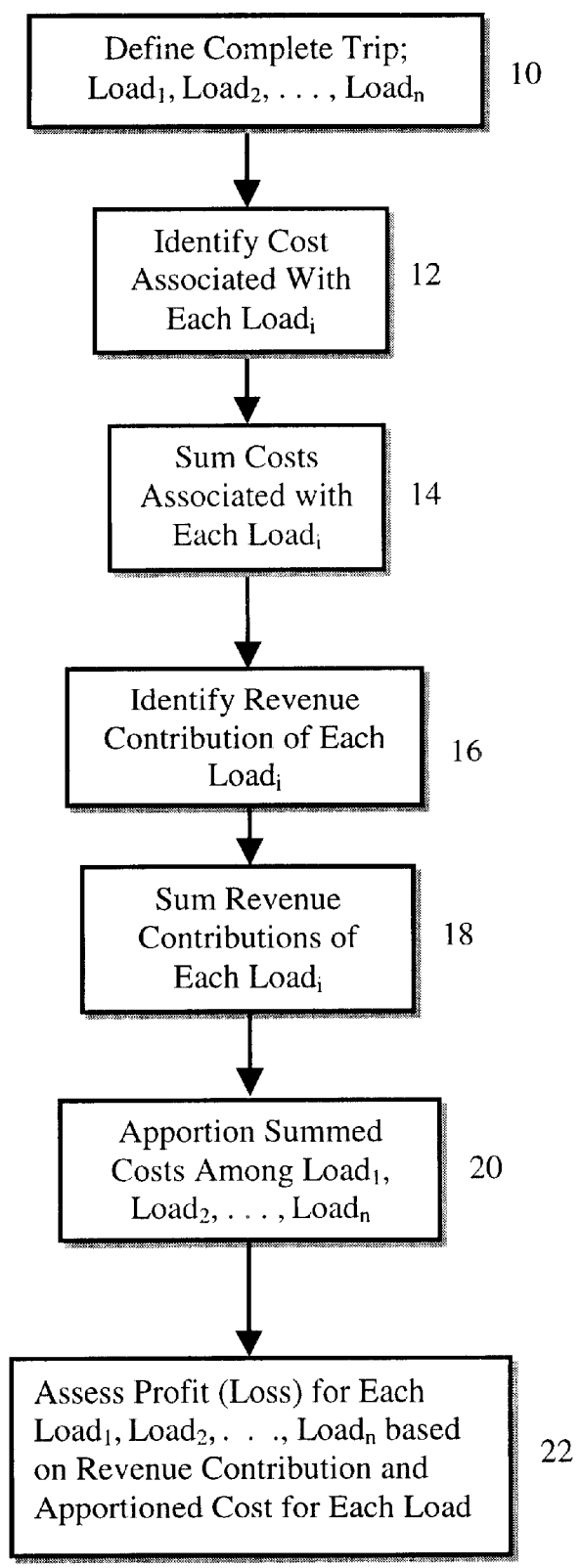
FIG. 1 is a flowchart illustrating the method of the present invention.

FIG. 1 shows a flowchart illustrating the general steps associating with performing the cost and profit analysis method of the present invention. In the first step, step 10, a round trip is defined. In an irregular route environment, the round trip is defined as a trip starting at a designated home location and ending at a terminating location, which is typically, but not necessarily, the home location. The home location may be a driver's domicile or it may be at motor carrier's terminal facility. The round trip is defined in terms of the loads, both headhaul (outgoing) and backhaul (return) loads. Typically, a round, or complete, trip will involve several loads carried between various intermediate locations along the route, but the method of the present invention is applicable to any trip involving two or more loads.

In the second step, step 12, the costs associated with each load moved during the round trip are identified. The cost of each load can be divided into direct, or linehaul costs, which are costs directly associated with the operation of the vehicle, and indirect, or non-linehaul, costs. Linehaul costs primarily include driver wages and vehicle operation costs, such as fuel and maintenance costs, depreciation, vehicle insurance, and cargo heating or refrigeration costs, which are typically defined in terms of vehicle costs per mile. These costs are preferably calculated for both loaded miles and a portion of the round trip empty miles allocated to each load, as will be described in more detail below. Non-linehaul costs may include load handling costs, tank cleaning costs, assessments for loss and damage, and administrative costs, such as billing and collecting.

In step 14, the costs associated with all of the loads are summed to obtain a total, or summed, cost for the entire round trip.

In the next step, step 16, the revenue contribution of each of the loads is identified. The revenue contribution for each load is the money remuneration received by the motor carrier provider for picking up a load and transporting it to a drop-off destination.

In the next step of the method, step 18, the revenue contributions of all of the loads are summed to obtain a total revenue contribution for the round trip.

Next, in step 20, the summed costs of the entire round trip are apportioned among each of the loads carried during the round trip in a manner that will be described in more detail below. This adjusts the cost of individual loads so as to shift revenue inequities among loads in unbalanced (headhaul versus backhaul) lanes. The present invention performs this cost shifting on the basis of the recognition that each load is, in effect, a part of a round trip network. That is, if high profit (headhaul) loads create the need to incorporate low profit (backhaul) loads in order to complete the round trip network, then the deficit profitability of the backhaul shipments is a "cost" which should be borne by the associated headhaul loads.

After the total costs are apportioned amongst the loads of the round trip, the profit or loss of each of the loads is assessed based on the revenue contribution and the apportioned cost for that load, so as to determine a profit or loss for each load within the context of the entire round trip during that which that load is carried. Such information will help motor freight carriers set their prices in a manner so as to better cover their actual costs. Moreover, this information will permit carriers to better evaluate and tailor their operations in the particular marketplace so as to maximize profits. That is, motor carriers can, with the information provided by the method of the present invention, assess the profitability of various aspects of their operations, such as particular customers, drivers, routes, destinations, commodities, and dispatchers. Moreover, the information provided by the method of the present invention, which is historical in nature, can be used as a prognosticator for costs and profits to be expected in future loads, so as to better enable motor carriers to set competitive prices that will cover actual costs and allow for a reasonable profit.

Figure 2:
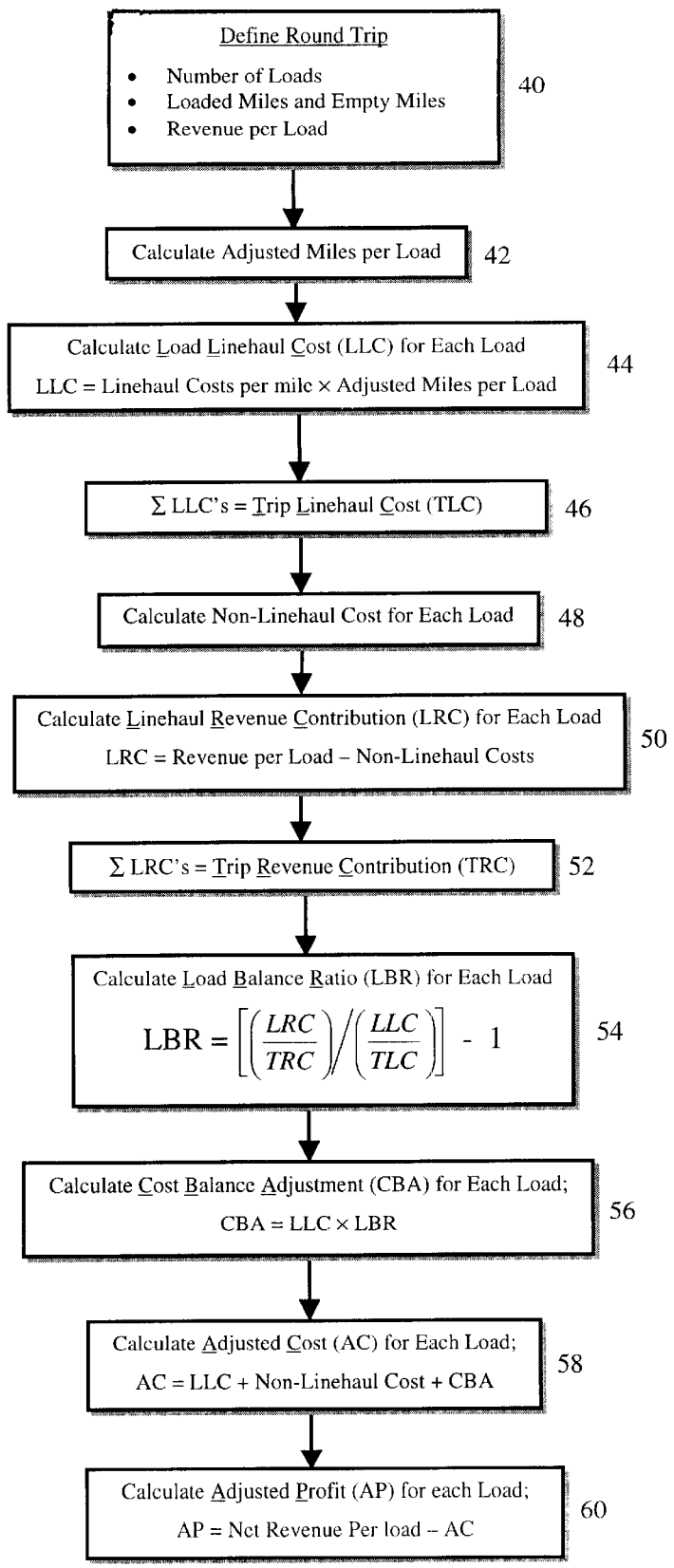
FIG. 2 is a flowchart illustrating a preferred embodiment of the method of the present invention.

FIG. 2 is a flowchart showing each of the steps to be performed according to a preferred manner of carrying out the method of the present invention.

In the first step, step 40, the complete round trip is defined in terms of each of the loads carried from the time the driver leaves the designated home location until the driver reaches the terminating location. Both loaded miles and empty miles are identified during the round trip. In particular, the miles associated with each load are identified and all empty, i.e., nonload-hauling miles, are identified. The empty miles are summed to obtain the total empty miles driven during the round trip, and the loaded miles are summed to obtain the total loaded miles per round trip. Finally, the revenue generated for each load is identified.

In the next step, step 42, the adjusted miles per load are calculated. Adjusted miles per load are calculated by allocating some portion of the empty miles to each of the loads carried during the round trip. This is done because there are costs associated with operating the vehicle, such as vehicle costs and driver labor costs, which are incurred regardless of whether the vehicle is loaded or empty. Accordingly, an accurate assessment of the cost of each load must take into account the fact that the loads carried during the round trip must bear some portion of the costs incurred for empty operation of the vehicle.

There are a number of accepted methods for allocating empty miles to associated loads. For example, in one method, half of the empty miles immediately preceding and immediately following each load are added to the miles of that load. Another recognized method for allocating empty miles is to calculate an empty to loaded miles ratio. That is, the ratio of the total number of empty miles of the round trip to the total number of loaded miles of the round trip is calculated. Thereafter, the empty miles are allocated by increasing the number of miles associated with each load in accordance with the empty to loaded miles ratio. For example, if the actual loaded miles associated with a particular load were 200 and the empty to loaded miles ratio for the complete round trip were 10% (i.e., 0.10), the number of vehicle miles that would be "allocated" to that load (i.e., the adjusted miles) for the purposes of calculating linehaul costs would be 200 plus 10%, or 220 miles.

In the next step, step 44, the load linehaul cost (LLC) is calculated for each load. Typically, linehaul costs, such as vehicle operating costs and driver labor costs, are derived in terms of a known cost per mile of vehicle operation. Therefore, the load linehaul cost for each load is calculated by multiplying the linehaul costs per mile by the adjusted miles per load. Actual driver payments may be used in lieu of including wages in the cost per mile calculation, particularly if different rates are paid for different situations, such as single versus dual (team) driver arrangements.

In the next step, step 46, the load linehaul costs are summed to obtain a trip linehaul cost (TLC) for the complete round trip.

In the next step, step 48, the non-linehaul costs are calculated for each load.

In the next step, step 50, the linehaul revenue contribution (LRC) of each load is calculated by subtracting the non-linehaul costs for each load from the revenue generated for each load. That is, the linehaul revenue contribution is the amount of revenue remaining for each load after accounting for that load's specific non-linehaul costs.

In the next step, step 52, the linehaul revenue contributions for all loads are summed to obtain a trip revenue contribution (TRC), which is the total amount of revenues generated by the round trip after accounting for all non-linehaul costs.

In the next step, step 54, the load balance ratio (LBR) is calculated for each load. As shown in step 54, the load balance ratio is calculated by dividing the ratio of the linehaul revenue contribution for each load to the trip revenue contribution by the ratio of the load linehaul cost for each load to the trip linehaul cost and subtracting 1 from that quotient.

In step 56, the cost balance adjustment (CBA) for each load is calculated by multiplying the load linehaul costs for each load by the load balance ratio calculated for each load.

In the next step, step 58, the adjusted cost (AC) for each load is calculated by adding the non-linehaul cost and the cost balance adjustment for that load to the load linehaul cost for that load.

It will be appreciated, by working through the equations set forth in steps 54, 56, and 58, that the adjusted cost for each load can be directly calculated by the following equation:

$$AC = (LRC/TRC) \times TLC + \text{Non-Linehaul Cost}.$$

The above "shortcut" does not, however, provide the load balance ratio (LBR) or the cost balance adjustment (CBA), which may themselves provide useful information for cost analysis purposes. The above equation does demonstrate that the total linehaul cost for the round trip is, according to the present invention, apportioned among the loads of the round trip by multiplying the total linehaul cost by the ratio of the load revenue contribution for each load to the total round trip revenue contribution.

Finally, in step 60, the adjusted profit (AP) is calculated for each load by subtracting the adjusted cost for each load from the revenue for that load.

It can be appreciated that the total profit for the complete round trip is the same whether the method of the present invention is used or not. That is, the total profit for the round trip calculated by subtracting actual linehaul costs and non-linehaul costs from revenues does not change by using the method of the present invention. What the present invention allows, however, is a means for apportioning the total cost of the round trip, and therefore, the total profits of the round trip, to each of the loads carried during the round trip in the context of that load's contribution to the revenue and costs of the total round trip.

Based on the equations set forth in steps 54, 56 and 58, some general observations about the method of the present invention can be made.

If LRC/TRC is less than LLC/TLC, meaning that the particular load has a higher relative contribution to the total linehaul cost of the round trip than its relative contribution to the total revenue of the round trip, the load balance ratio, and therefore the cost balance adjustment for that load will be less than 0. Accordingly, the adjusted cost will be less than the direct cost incurred during that load. This is cost shifting in the context of the complete round trip. That is, this relatively low profit load is a cost that must be borne other loads.

On the other hand, if LRC/TRC is greater than LLC/TLC, meaning that the load has a higher relative contribution to the total revenue than its relative contribution to the total linehaul cost, the load balance ratio, and therefore the cost balance adjustment for that load will be greater than 0. Accordingly, the adjusted cost for this load will actually be higher than the actual cost. Again, this is cost shifting in the context of the complete round trip. That is, this relatively high profit load will be required to bear some portion of the costs of lower profit loads.

Finally, if LRC/TRC is equal to LLC/TLC, meaning that the load has the same relative contribution to both the total revenue and the total linehaul cost, the load balance ratio, and thus the cost balance adjustment, will be 0. Therefore, the adjusted cost will be equal to the actual cost. This is neither a high profit load to which the costs of low profit loads are to be shifted, nor is it a low profit load from which costs are to be shifted to high profit loads.

Figure 3:
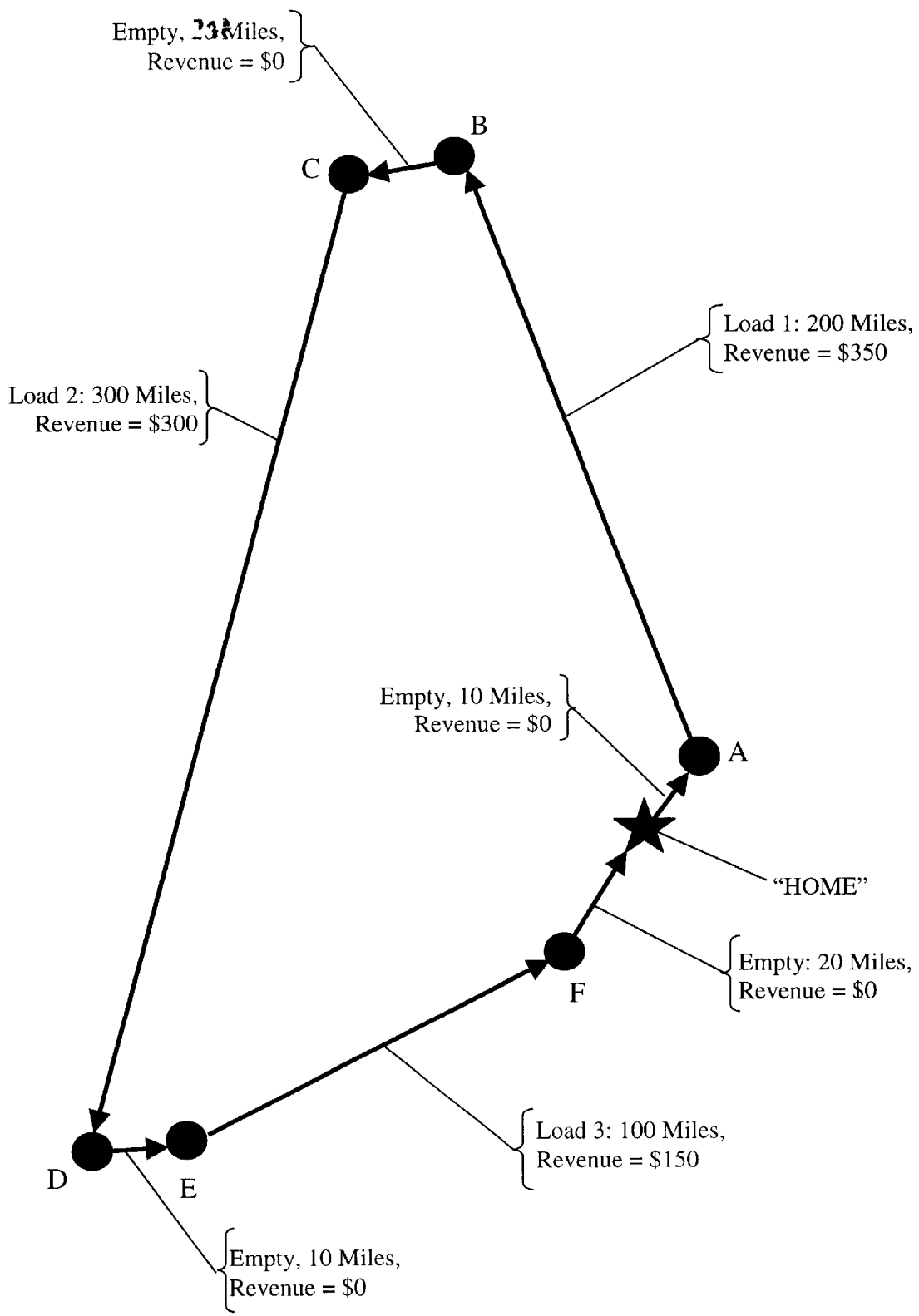
FIG. 3 is schematic map showing a hypothetical round trip for illustrating the method of the present invention.

FIG. 3 shows a schematic "map" and Table 1 below provides hypothetical data for a round trip for illustrating the method of the present invention.

TABLE 1

| Trip Leg | Load | Distance (Miles) | Revenue ($) | Linehaul Cost ($)* | Non-Linehaul Cost ($)† |
|---|---|---|---|---|---|
| Home → A | Empty | 10 | 0 | 1/mi. + 8% | 0 |
| A → B | Load 1 | 200 | 350 | 1/mi. + 8% | 14 + 8% |
| B → C | Empty | 20 | 0 | 1/mi. + 8% | 0 |
| C → D | Load 2 | 300 | 300 | 1/mi. + 8% | 14 + 8% |
| D → E | Empty | 10 | 0 | 1/mi. + 8% | 0 |
| E → F | Load 3 | 100 | 150 | 1/mi. + 8% | 14 + 8% |
| F → Home | Empty | 20 | 0 | 1/mi. + 8% | 0 |

*Linehaul costs = $0.45/mi. diver labor cost + $0.55/mi. vehicle cost + 8% overhead
†Non-Linehaul costs = $10 per load handling + $4 per load administrative + 8% overhead To illustrate the cost and profit analysis of the invention, the above data will be evaluated in accordance with the preferred method shown in FIG. 2, to determine the adjusted costs and profits of loads 1, 2, and 3.

A. Calculate adjusted miles per load (Step 42) using the empty/loaded miles ratio method.

Total loaded miles for round tri=200+300+100=600
    Total empty miles for round trip=10+20+10+20=60
        60 empty miles/600 total loaded miles=0.10 (10%)
          Adjusted Miles:
    Load 1: 200×(1+0.10)=220 miles
    Load 2: 300×(1+0.10)=330 miles
    Load 3: 100×(1+0.10)=110 miles B. Calculate the Load Linehaul Cost ($LLC_i$) for each load (step 44).

Load 1: $LLC_1 = [\$1.00/\text{mile} \times 220 \text{ miles}] \times [1+0.08 \text{ (overhead)}] = \$237.60$ Load 2: $LLC_2 = [\$1.00/\text{mile} \times 330 \text{ miles}] \times [1+0.08 \text{ (overhead)}] = \$356.40$ Load 3: $LLC_3 = [\$1.00/\text{mile} \times 110 \text{ miles}] \times [1+0.08 \text{ (overhead)}] = \$118.80$ C. Sum the Load Linehaul costs to obtain Trip Linehaul Cost (TLC) (step 46)

$TLC = \$237.60 + \$356.40 + \$118.80 = \$712.80$

D. Calculate Non-Linehaul Cost for each load (Step 48).

Load 1: $\$14.00 \times [1+0.08 \text{ (overhead)}] = \$15.12$

Load 2: $\$14.00 \times [1+0.08 \text{ (overhead)}] = \$15.12$

Load 3: $\$14.00 \times [1+0.08 \text{ (overhead)}] = \$15.12$

E. For comparison purposes, calculate non-adjusted cost and profit (loss) for each load.

Load 1:
 Cost=$237.60+$15.12=$252.72
 Profit=$350.00−$252.72=$97.28

Load 2:
 Cost=$356.40+$15.12=$371.52
 (Loss)=$300.00−$371.52=($71.52)

Load 3:
 Cost=$118.80+$15.12=$133.92
 Profit=$150.00−$133.92=$16.08

Total Round Trip Cost=$758.16

Total Round Trip Profit=$41.84

F. Calculate Linehaul Revenue Contribution ($LRC_i$) for each load (Step 50).

Load 1: $LRC_1 = \$350.00 - \$15.12 = \$334.88$

Load 2: $LRC_2 = \$300.00 - \$15.12 = \$284.88$

Load 3: $LRC_3 = \$150.00 - \$15.12 = \$134.88$

G. Calculate the Trip Revenue Contribution (TRC) (Step 52).

$TRC = \$334.88 + \$284.88 + \$134.88 = \$754.64$

H. Calculate the Load Balance Ratio ($LBR_i$) for each load (Step 54).

$$LBR_i = \left[\left(\frac{LRC_i}{TRC}\right) \Big/ \left(\frac{LLC_i}{TLC}\right)\right] - 1$$

Load 1: $LBR_1 = 0.3313$

Load 2: $LBR_2 = -0.2450$

Load 3: $LBR_3 = 0.0724$

I. Calculate the Cost Balance Adjustment ($CBA_i$) for each load (Step 56).

Load 1: $CBA_1 = \$237.60 \times (0.3313) = \$78.72$

Load 2: $CBA_2 = \$356.40 \times (-0.2450) = -\$87.32$

Load 3: $CBA_3 = \$118.80 \times (0.0724) = \$8.60$

J. Calculate the Adjusted Cost ($AC_i$) for each load (Step 58).

| Load 1: | $AC_1 = \$237.60 + \$15.12 + \$78.72 = \$331.44$ |
|---|---|
| Load 2: | $AC_2 = \$356.40 + \$15.12 - \$87.32 = \$284.20$ |
| Load 3: | $AC_3 = \$118.80 + \$15.12 + \$8.60 = 142.52$ |
| Total = | $758.16 |

Note that the total cost has not changed from that calculated above in step E. The costs have been merely reapportioned among the three loads.

K. Calculate the Adjusted Profit ($AP_i$) for each load (Step 60).

| Load 1: | $AP_1 = \$350.00 - \$331.44 = \$18.56$ |
|---|---|
| Load 2: | $AP_2 = \$300.00 - \$284.20 = \$15.80$ |
| Load 3: | $AP_3 = \$150.00 - \$142.52 = \$7.48$ |
| Total | $41.84 |

As with the total cost, note that the total profit has not changed from that calculated above in step E. The profit has merely been reapportioned among the three loads.

It will be apparent to those of ordinary skill that the present invention as described above may be implemented in many different embodiments of software, firmware, and hardware. For example, various components of the embodiments described herein may be performed by a computer processing instructions conveyed via a computer-readable medium. The actual software code or specialized control hardware used to implement the present invention is not limiting of the present invention. Thus, the operation and behavior of the embodiments have been described without specific reference to the actual software code or specialized hardware components.

While the invention has been described in connection with what is presently considered to be the most practical and preferred embodiments, it is to be understood that the invention is not to be limited to the disclosed embodiments, but, on the contrary, is intended to cover various modifications and equivalent arrangements and procedures included within the spirit and scope of the appended claims.

What is claimed is:

1. A method for analyzing the profitability of each of two or more freight loads moved within a round trip of a freight vehicle during which the two or more freight loads are moved, one at a time, from one location along the round trip route to another location along the round trip route by the freight vehicle, said method comprising:

identifying a revenue contribution of each of the two or more freight loads of the round trip;

summing the revenue contributions of the two or more freight loads to obtain a total round trip revenue;

identifying a cost associated with each of the two or more freight loads of the round trip;

summing the costs associated with the two or more freight loads to obtain a total round trip cost; and apportioning the total round trip cost among each of the two or more freight loads based on the revenue contribution of the freight load, the total round trip revenue, and the total round trip cost.

2. The method of claim 1, wherein said cost identification comprises:

identifying linehaul costs for each of the two or more freight loads, said linehaul costs comprising costs directly associated with operating the freight vehicle while moving the freight load from one location along the round .trip route to another location along the round trip route; and identifying non-linehaul costs for each of the two or more freight loads, said non-linehaul costs comprising costs associated with the freight load but not directly related to operating the motor vehicle while moving the freight load.

3. The method of claim 2, wherein said revenue contribution identification comprises calculating a linehaul revenue contribution for each freight load by subtracting the non-linehaul costs associated with the freight load from the revenue contribution of the freight load, and said revenue contribution summation comprises summing the linehaul revenue contributions of the two or more freight loads to obtain total linehaul revenue.

4. The method of claim 2, further comprising:
identifying loaded miles for each of the two or more freight loads during which the freight vehicle moves the freight load from one location along the round trip route to another location along the round trip route;
identifying empty miles for the round trip during which the freight vehicle moves from one location along the round trip route to another location along the round trip route without moving any of the two or more freight loads;
allocating the empty miles among each of the two or more freight loads; and
adding the allocated empty miles for each of the two or more freight loads to the loaded miles for the freight load to obtain adjusted miles for the freight load,
wherein said linehaul cost of each of the two or more freight loads is determined based on the adjusted miles of the freight load.

5. The method of claim 4, wherein said empty miles allocation comprises:
summing the loaded miles of each freight load to obtain total round trip loaded miles;
calculating a ratio of the empty miles of the round trip to the total round trip loaded miles; and
calculating the adjusted miles for each freight load by adding to the loaded miles for that freight load the product of the loaded miles for that freight load and the ratio of empty miles to total round trip loaded miles.

6. The method of claim 3, said total round trip cost apportioning comprising:
calculating a relative revenue contribution for each of the two or more freight loads as a ratio of the linehaul revenue contribution for that freight load to the total linehaul revenue;
summing the linehaul costs for each freight load to obtain total linehaul costs;
calculating a relative cost contribution for each of the two or more freight loads as a ratio of the linehaul costs for that freight load to the total linehaul costs; and
comparing the relative revenue contribution for the freight load to the relative cost contribution for the freight load.

7. The method of claim 6, said total round trip cost apportioning further comprising:
calculating a load balance ratio for each freight load as 1 subtracted from the ratio of the relative revenue contribution for that freight load to the relative cost contribution for that freight load;
calculating a cost balance adjustment for each freight load as the product of the load balance ratio for that freight load and the linehaul cost for that freight load; and
calculating an adjusted cost for each freight load as the sum of the linehaul cost for that freight load, the cost balance adjustment for that freight load, and the non-linehaul cost for that freight load.

8. The method of claim 1, wherein the round trip is defined as a complete series of freight vehicle movements occurring from a time the freight vehicle leaves a designated home location until the freight vehicle returns to the home location.

9. A computer-readable medium encoded with a plurality of processor-executable instruction sequences for analyzing the profitability of each of two or more freight loads moved during a roundtrip of a freight vehicle during which the two or more freight loads are moved, one at a time, from one location along the trip route to another location along the trip route by the freight vehicle, said instruction sequences comprising:
identifying a revenue contribution of each of the two or more freight loads of the trip;
summing the revenue contributions of the two or more freight loads to obtain a total round trip revenue;
identifying a cost associated with each of the two or more freight loads of the trip;
summing the costs associated with the two or more freight loads to obtain a total round trip cost; and
apportioning the total round trip cost among each of the two or more freight loads based on the revenue contribution of the freight load, the total round trip revenue, and the total round trip cost.

10. The computer-readable medium of claim 9, wherein said instruction sequences for cost identification comprise:
identifying linehaul costs for each of the two or more freight loads, said linehaul costs comprising costs directly associated with operating the freight vehicle while moving the freight load from one location along the round trip route to another location along the round trip route; and
identifying non-linehaul costs for each of the two or more freight loads, said non-linehaul costs comprising costs associated with the freight load but not directly related to operating the motor vehicle while moving the freight load.

11. The computer-readable medium of claim 10, wherein said instruction sequences for revenue contribution identification comprise calculating a linehaul revenue contribution for each freight load by subtracting the non-linehaul costs associated with the freight load from the revenue contribution of the freight load, and said instruction sequence for revenue contribution summation comprises summing the linehaul revenue contributions of the two or more freight loads to obtain total linehaul revenue.

12. The computer-readable medium of claim 10, said instruction sequences further comprising:
identifying loaded miles for each of the two or more freight loads during which the freight vehicle moves the freight load from one location along the round trip route to another location along the round trip route;
identifying empty miles for the trip during which the freight vehicle moves from one location along the round trip route to another location along the round trip route without moving any of the two or more freight loads;
allocating the empty miles among each of the two or more freight loads; and
adding the allocated empty miles for each of the two or more freight loads to the loaded miles for the freight load to obtain adjusted miles for the freight load,
wherein said linehaul cost of each of the two or more freight loads is determined based on the adjusted miles of the freight load.

13. The computer-readable medium of claim 12, wherein said instruction sequences for empty miles allocation comprise:
summing the loaded miles of each freight load to obtain total round trip loaded miles;

calculating a ratio of the empty miles of the round trip to the total round trip loaded miles; and calculating the adjusted miles for each freight load by adding to the loaded miles for that freight load the product of the loaded miles for that freight load and the ratio of empty miles to total round trip loaded miles.

14. The computer-readable medium of claim 11, said instruction sequences for total round trip cost apportioning comprising:

calculating a relative revenue contribution for each of the two or more freight loads as a ratio of the linehaul revenue contribution for that freight load to the total linehaul revenue;

summing the linehaul costs for each freight load to obtain total linehaul costs;

calculating a relative cost contribution for each of the two or more freight loads as a ratio of the linehaul costs for that freight load to the total linehaul costs; and comparing the relative revenue contribution for that freight load to the relative cost contribution for that freight load.

15. The computer-readable medium of claim 14, said instruction sequences for total round trip cost apportioning further comprising:

calculating a load balance ratio for each freight load as 1 subtracted from the ratio of the relative revenue contribution for that freight load to the relative cost contribution for that freight load;

calculating a cost balance adjustment for each freight load as the product of the load balance ratio for that freight load and the linehaul cost for that freight load; and calculating an adjusted cost for each freight load as the sum of the linehaul cost for that freight load, the cost balance adjustment for that freight load, and the non-linehaul cost for that freight load.

* * * * *